UNITED STATES PATENT OFFICE.

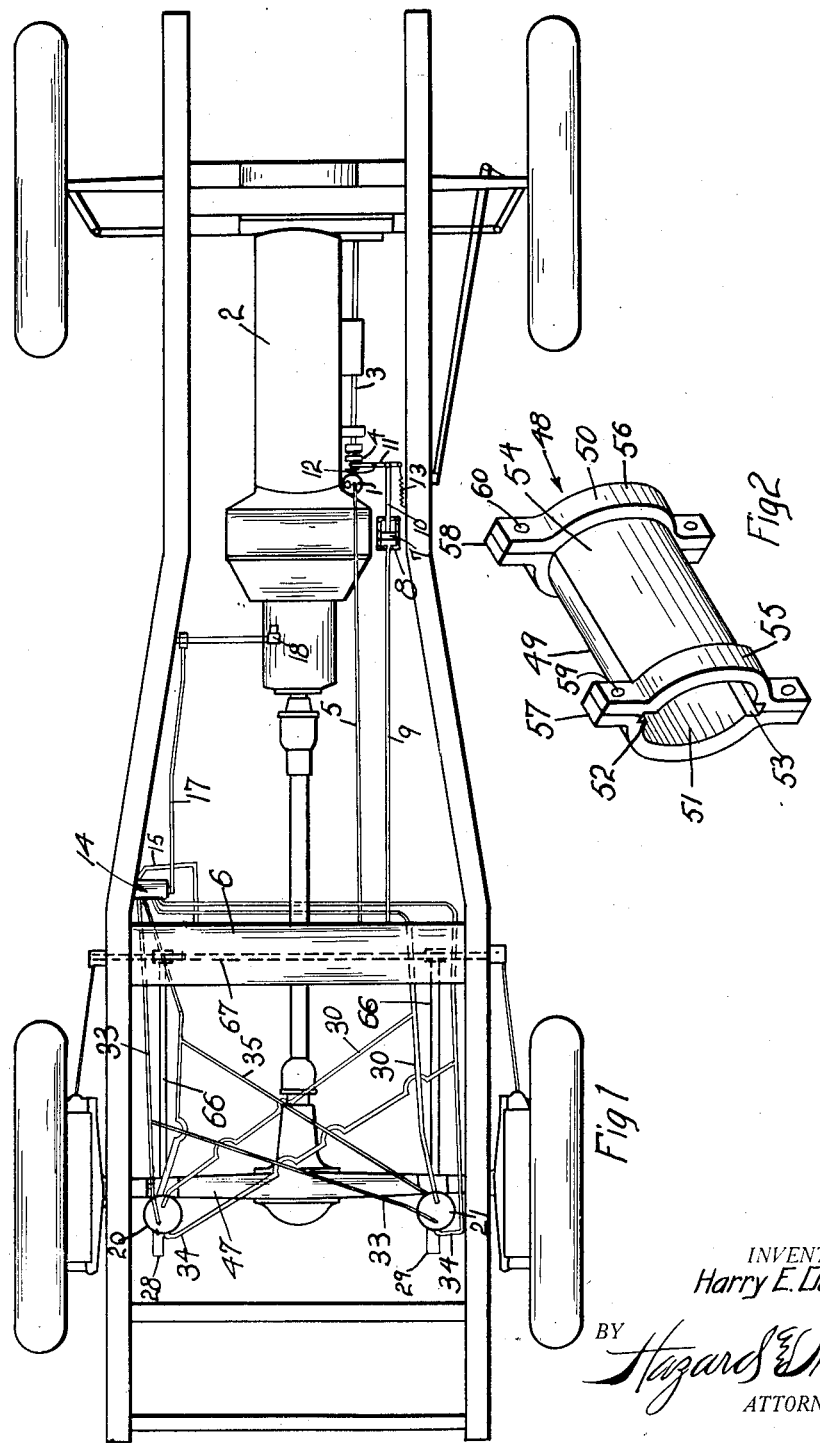

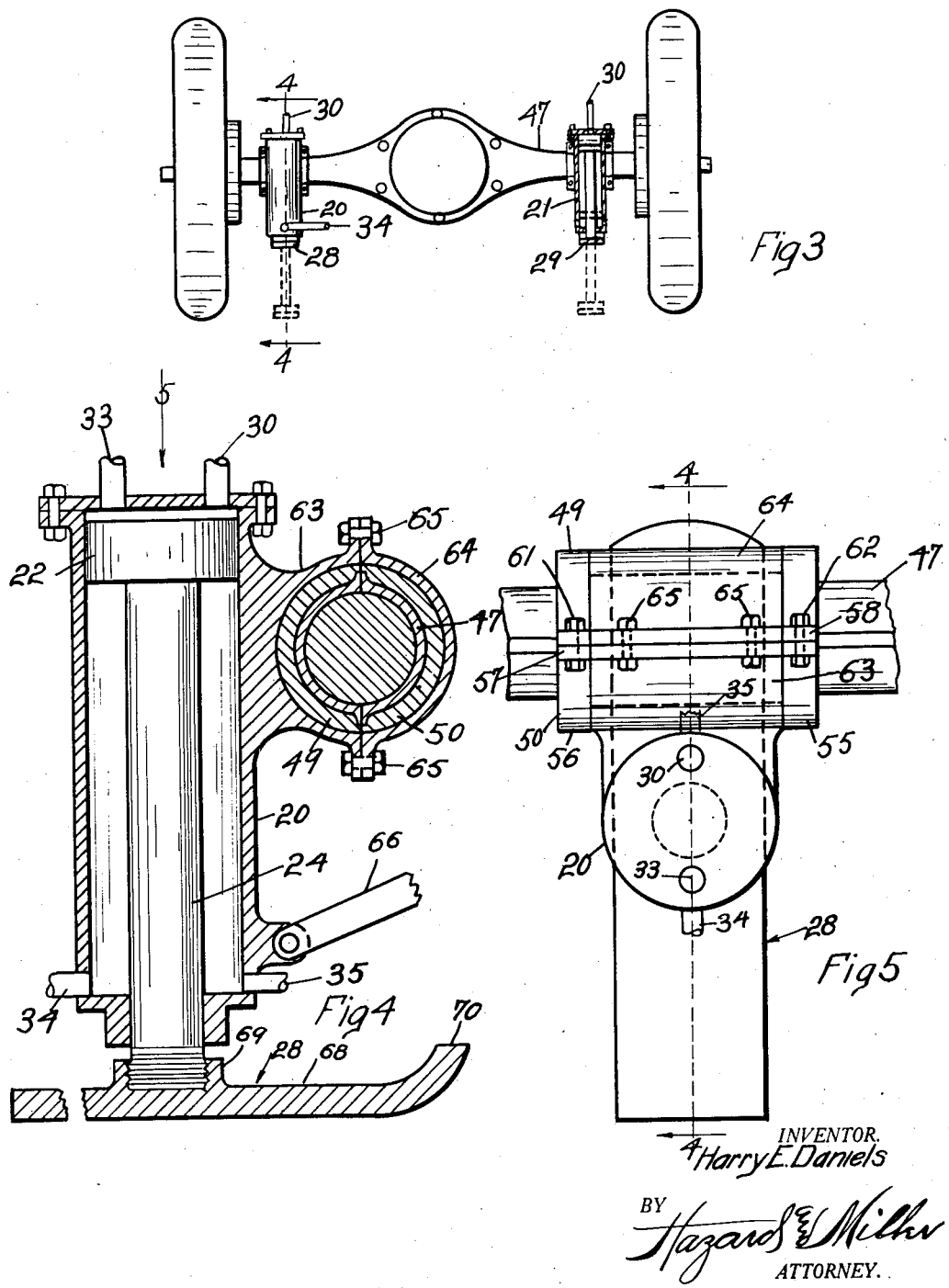

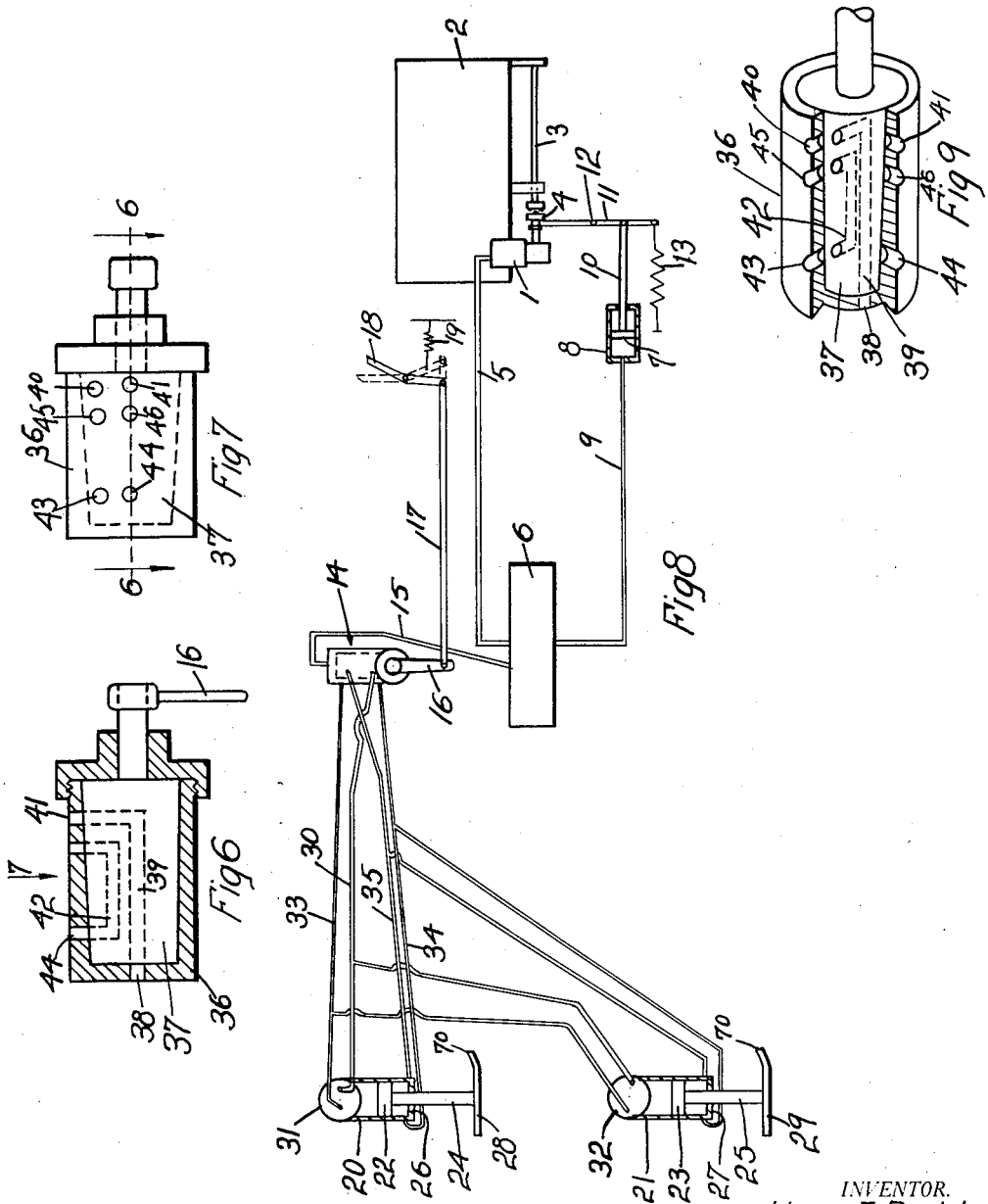

HARRY E. DANIELS, OF FRESNO, CALIFORNIA.

ANTISKIDDING DEVICE FOR AUTOMOBILES, &c.

1,330,110.  Specification of Letters Patent.  Patented Feb. 10, 1920.

Application filed June 4, 1919. Serial No. 301,840.

*To all whom it may concern:*

Be it known that I, HARRY E. DANIELS, a citizen of the United States, residing at Fresno, in the county of Fresno and State of California, have invented new and useful Improvements in Antiskidding Devices for Automobiles, &c., of which the following is a specification.

My object is to make an anti-skidding device for automobiles and the like, and my invention consists of the novel features herein shown, described and claimed.

Figure 1 is a diagrammatic top plan view of the frame and running gear of an automobile with an anti-skidding device applied in accordance with the principles of my invention.

Fig. 2 is an enlarged perspective of one of the bushings for the axle housing.

Fig. 3 is a rear elevation of the rear axle housing and rear wheel and showing my anti-skidding device, part being shown in section.

Fig. 4 is an enlarged sectional detail on the lines 4—4 of Figs. 3 and 5.

Fig. 5 is an enlarged fragmentary top plan view as seen looking in the direction indicated by the arrow 5 in Fig. 4.

Fig. 6 is an enlarged sectional detail of the controller valve, the view being taken on the line 6—6 of Fig. 7 and looking in the direction indicated by the arrow.

Fig. 7 is a side elevation looking in the direction indicated by the arrow 7 in Fig. 6.

Fig. 8 is a diagram of the anti-skidding device removed from the automobile.

Fig. 9 is a perspective detail of the controller valve shown in Figs. 6 and 7.

Referring especially to Fig. 8, the pump 1 is mounted beside the engine 2. The shaft 3 is continuously driven by the engine when the engine is running, and the shaft 3 is connected to the pump 1 by a clutch 4. The pump 1 pumps air through the pipe 5 to the storage tank 6. The piston 7 is mounted in the piston cylinder 8, and the pipe 9 connects the storage tank 6 to the cylinder 8 at one side of the piston 7.

The piston rod 10 is connected to a lever 11 mounted upon a pivot 12, and one end of the lever 11 is connected to operate the clutch 4. A retractile coil spring 13 is connected to the other end of the lever and to the same end of the lever as the piston rod 10, so that when the pressure goes up in the tank 6 it will operate the piston 7 to operate the piston rod 10 to operate the lever 11 and disconnect the clutch 4, and when the pressure goes down in the tank 6 the tension of the spring 13 will operate the lever 11 to connect the clutch 4 to operate the pump to pump more air into the tank 6.

The controller valve 14 is mounted in a convenient position and the pipe 15 connects the tank 6 to the valve 14. The crank arm 16 is connected to the controller valve 14, and a link 17 connects the crank arm 16 to the foot pedal 18. A retractile coil spring 19 is connected to the frame and to the pedal 18, the tension of the spring 19 being exerted to hold the pedal in neutral position with the anti-skidding device out of operation.

Piston cylinders 20 and 21 are fixed upon the rear axle, pistons 22 and 23 are mounted in the piston cylinders, piston rods 24 and 25 extend downwardly from the pistons through the heads 26 and 27 in the piston cylinders, and the anti-skidding shoes 28 and 29 are fixed upon the lower ends of the piston rods 24 and 25.

A pressure pipe 30 connects the controller valve 14 to the upper heads 31 and 32 of the pistons 20 and 21, and an exhaust pipe 33 connects the heads 31 and 32 to the controller valve 14; so that when the pedal 18 is pushed forwardly, as shown in full lines, the air pressure from the tank 6 passes through the pipe 15 to the controller valve 14 and through the pipe 30 to the upper sides of the pistons 22 and 23 and forces the pistons downwardly to force the shoes 28 and 29 in contact with the ground and hold the automobile or the like from skidding; and so that when the pedal 18 is released, the tension of the spring 19 swings the pedal to the normal position shown in dotted lines thereby operating the valve 14 to shut the pressure off from the pipe 30 and open the pipe 33 and allow the pressure to exhaust from above the pistons.

A pressure pipe 34 connects the controller valve 14 to the lower sides of the pistons 22 and 23, and an exhaust pipe 35 connects the lower sides of the pistons to the controller valve; so that when the pedal 18 is released the controller valve 14 is operated to send the air pressure through the pipe 34 to the lower sides of the pistons 22 and 23 and raise the pistons and put the anti-skidding device out of use; and so that when the pedal 18 is operated to put the anti-skidding device into use the exhaust pipe 35 is opened to relieve the pressure from below the pistons.

It is intended to carry a substantially constant pressure in the storage tank 6 of say eighty pounds and to set the pressure regulator consisting of the cylinder 8, piston 10, and spring 13 so as to maintain this pressure.

Referring to Figs. 6, 7 and 9, the details of the controller valve 14 are as follows:

The cylindrical casing 36 has a tapered chamber, and the cylindrical tapered valve plug 37 fits in this chamber. The pipe 15 is connected to the port 38 in the bottom of the casing 36 and the passage 39 leads from the port 38 through the plug 37 to register with the ports 40 and 41. The pressure pipe 30 is connected to the port 40 and the pressure pipe 34 is connected to the port 41.

The passage 42 is formed in and out through the periphery of the plug 37, the lower end of the passage registering with the ports 43 and 44 in the casing, and the upper end of the passage 42 registering with the ports 45 and 46 in the casing.

The exhaust pipe 35 is connected to the port 43 and the exhaust pipe 33 is connected to the port 44, so that when the plug 37 is turned to register the passage 39 with the port 40 the compressed air will pass through the pipe 30 to the upper ends of the pistons, and the exhaust from the lower ends of the pistons will pass through the pipe 35 to the port 43 and through the passage 42 and outwardly through the port 45, and when the plug 37 is turned to register the opening 39 with the port 41 to send the compressed air through the pipe 34 to the lower sides of the pistons 22 and 23 the exhaust from the upper sides of the pistons will pass through the pipe 33 to the port 34 and through the passage 42 and exhaust from the port 46.

Referring to Figs. 2, 3 and 5, the piston cylinders 20 and 21 and the coöperating parts for operating the anti-skidding shoes 28 and 29 are substantially alike, and the details are as follows:

The axle housing 47 may be of various forms and bushings 48 are fitted to the axle housing one at each end of the housing. The bushings 48 comprise the mating pieces 49 and 50 forming openings 51 in which the axle housing fits. The openings 51 must be varied to suit the different axle housings. Slots 52 and 53 extend from the openings 51 to receive the flanges of the axle housing and hold the bushings from rotating upon the axle housing. The central portions of the members 49 and 50 are rounded to form the supporting bearings 54, there being flanges 55 and 56 at the ends of the bearing portions 54, and ears 57 and 58 extend up and down from the flanges for clamping the two members together so as to rigidly mount the bushings upon the axle housing. Bolt holes 59 and 60 are formed through the clamping ears 57 and 58, and bolts 61 and 62 are inserted through the bolt holes.

The piston cylinders 20 and 21 are formed integral with the half bearings 63 fitting the bearings 54 half way around the bearings 54 and separate half bearings 64 fit the other half way around the bearings 54, and the half bearings 63 and 64 are connected together by bolts 65. Braces 66 connect the lower ends of the piston cylinders to the frame crossbar 67.

The anti-skidding shoes 28 and 29 are substantially alike and the shoes are flat plates 68 having internally screw threaded bosses 69 screwed upon the lower ends of the piston rods 24 and 25 and having upturned forward ends 70. The shoes are of considerable length and form runners which will allow the vehicle to slide ahead to a limited extent and will effectually prevent the vehicle from skidding or slowing sidewise.

Thus I have produced an anti-skidding device for vehicles comprising a pump connected to be operated intermittently from the engine, a pressure regulator for throwing the pump into and out of operation, a storage tank connected to the pump and to the pressure regulator, a controller valve connected to the storage tank, a pedal for operating the controller valve, piston cylinders mounted upon the rear axle, pistons in the piston cylinders, anti-skidding shoes connected to the pistons, and pipe connections between the piston cylinders and the controller valve; so that by manipulating the pedal the anti-skidding shoes may be forced downwardly against the ground, and so that by releasing the pedal the anti-skidding shoes will be elevated and held elevated.

Various changes may be made without departing from the spirit of my invention as claimed.

I claim:

1. An anti-skidding device for vehicles comprising a pump adapted to be connected to the running part of an engine, a pressure regulator for connecting and disconnecting the pump, a storage tank connected to the pump, a controller valve connected to the storage tank, a pedal connected to the controller valve, piston cylinders mounted upon the rear axle, pistons in the piston cylinders, anti-skidding shoes connected to the pistons, and pipes connecting the piston cylinders to the controller valve; so that when the pedal is operated the pistons will be forced downwardly to move the anti-skidding shoes downwardly to engage the ground, and so that when the pedal is released the pistons will be elevated to elevate the anti-skidding shoes and hold the anti-skidding shoes elevated.

2. An anti-skidding device for vehicles comprising air cylinders adapted to be mounted upon the vehicle, pistons mounted within the cylinders having downwardly extending rods, anti-skidding shoes carried on the lower ends of the rods and adapted to engage the ground, pressure pipes for admitting air to the cylinders, means for admitting air to the pressure pipes, and means for holding the anti-skidding shoes out of engagement with the ground.

In testimony whereof I have signed my name to this specification.

HARRY E. DANIELS.